US009540220B2

(12) United States Patent
Stewart et al.

(10) Patent No.: US 9,540,220 B2
(45) Date of Patent: Jan. 10, 2017

(54) DEVICE AND METHOD FOR MOVING A LOAD FROM A FIRST HEIGHT TO A SECOND HEIGHT

(75) Inventors: George Stewart, Raleigh, NC (US); Ty Hagler, Durham, NC (US)

(73) Assignee: 2S INNVATIONS, INC., Cary, NC (US)

( * ) Notice: Subject to any disclaimer, the term of this patent is extended or adjusted under 35 U.S.C. 154(b) by 881 days.

(21) Appl. No.: 13/091,286

(22) Filed: Apr. 21, 2011

(65) Prior Publication Data

US 2011/0262261 A1 Oct. 27, 2011

Related U.S. Application Data

(60) Provisional application No. 61/326,273, filed on Apr. 21, 2010.

(51) Int. Cl.
*B60P 1/00* (2006.01)
*B66F 7/08* (2006.01)
*B66F 7/06* (2006.01)

(52) U.S. Cl.
CPC ................ *B66F 7/08* (2013.01); *B66F 7/065* (2013.01); *B66F 7/0625* (2013.01)

(58) Field of Classification Search
CPC .......... B66F 7/0625; B66F 7/065; B66F 7/08; B66F 5/00; B66F 5/04; B66F 11/00; A61G 1/013; A61G 1/0567; A61G 3/02; B60P 1/4421; B62B 5/0003; B62B 2205/06; B62B 2203/073
USPC .. 414/334, 332, 392–395, 541, 490; 296/20; 280/43.14, 43.24
See application file for complete search history.

(56) References Cited

U.S. PATENT DOCUMENTS 4,288,195 A * 9/1981 Brewer .................... B62B 3/04 108/143
4,921,295 A * 5/1990 Stollenwerk ......... A61G 1/0293 296/20
5,346,355 A * 9/1994 Riemer ................ B60P 1/4435 224/310
6,431,319 B1 * 8/2002 Myers ...................... B62B 3/02 187/243
6,976,696 B2 * 12/2005 O'Krangley ......... A61G 1/0562 280/638
8,075,016 B2 * 12/2011 Silberberg ............. B62B 3/027 280/43
8,714,612 B2 * 5/2014 Chinn ............................ 296/20
(Continued)

*Primary Examiner* — Michael McCullough
*Assistant Examiner* — Mark Hageman
(74) *Attorney, Agent, or Firm* — NK Patent Law, PLLC

(57) ABSTRACT

The embodiments of the invention are directed to a device and method for moving a load from a first height at a first location to a second height at a second location. The device includes a platform having a top surface and a bottom surface, and opposed guide members extending from the bottom surface of the platform and oriented along and parallel to the length of the platform. The device further includes a support member slidably engaged with the guide members, the support member capable of extending beyond the length of the platform or retracting beneath the platform. The device further includes a lift assembly having a frame and a controller. The frame is pivotably secured to the lower surface of the support member. The frame has a pair of parallel, opposed, leg assemblies where the height of the leg assembly is adjustable, and the controller controls the height of the leg assemblies.

12 Claims, 7 Drawing Sheets

(56) References Cited

U.S. PATENT DOCUMENTS

2008/0093827 A1 * 4/2008 Silberberg ............ B62B 5/0003
280/651

* cited by examiner

DEVICE AND METHOD FOR MOVING A LOAD FROM A FIRST HEIGHT TO A SECOND HEIGHT

The embodiments are directed to a device and method for moving a load from a first height at a first location to a second height at a second location. The device includes a platform having a top surface and a bottom surface, and opposed guide members extending from the bottom surface of the platform and oriented along and parallel to the length of the platform. The device further includes a support member slidably engaged with the guide members, the support member capable of extending beyond the length of the platform or retracting beneath the platform. The device further includes a lift assembly having a frame and a controller. The frame is pivotably secured to the lower surface of the support member. The frame has a pair of parallel, opposed, leg assemblies where the height of the leg assembly is adjustable, and the controller controls the height of the leg assemblies.

DETAILED DESCRIPTION OF THE DRAWINGS

DESCRIPTION

Figure 1:
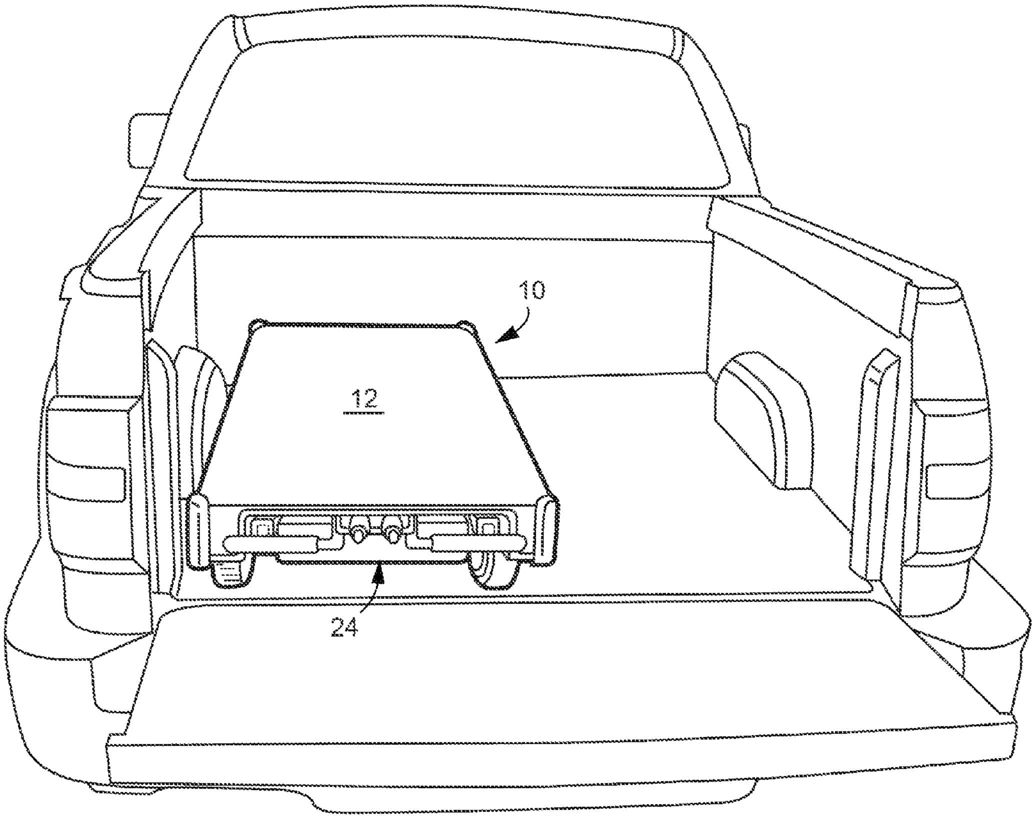
FIG. 1 is a perspective view of the first embodiment in a retracted, locked position in the back of a truck at a first height.

The embodiments of the present invention are directed to a device and system for moving a load from a first height at a first location, to a second height at a second location. The embodiments of the present invention are intended for use by a single person to move a load from a location such as the cargo bed of a pick-up truck to a second location such as a work room or garage. A first preferred embodiment 10 is shown in FIG. 1 in a stored and locked position.

Figure 2:
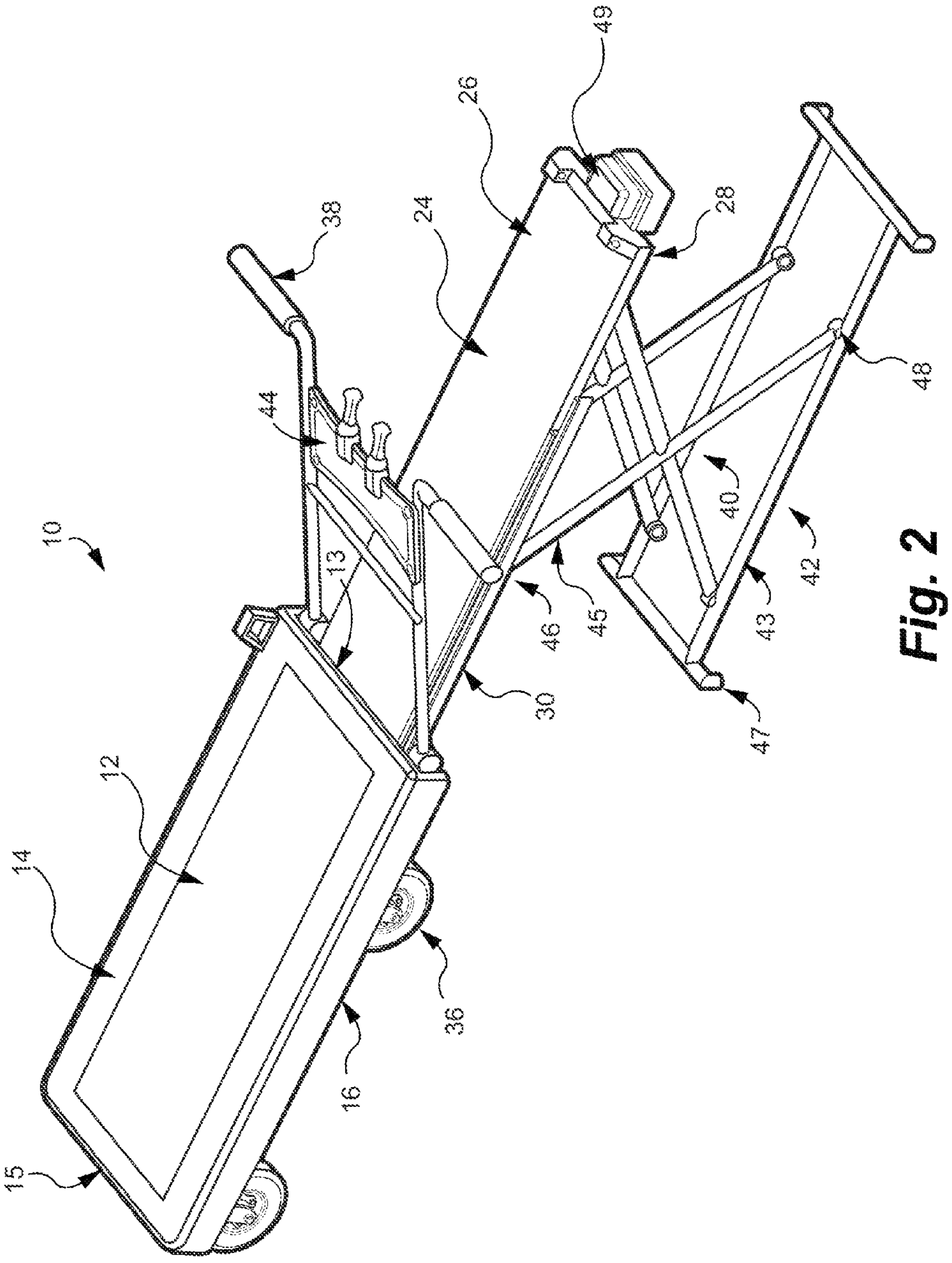
FIG. 2 is a perspective of the first embodiment in an extended position.
Figure 3:
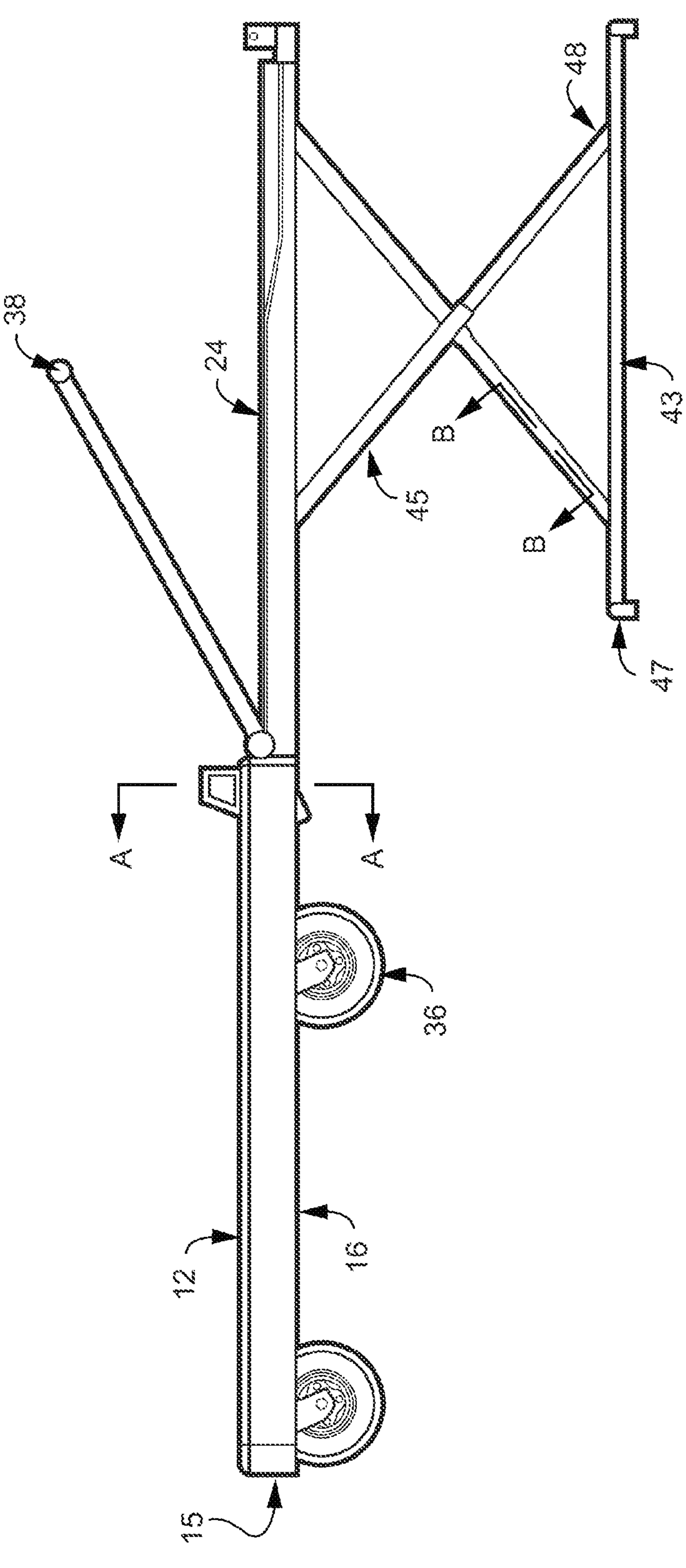
FIG. 3 is a side view of FIG. 2.
Figure 4:
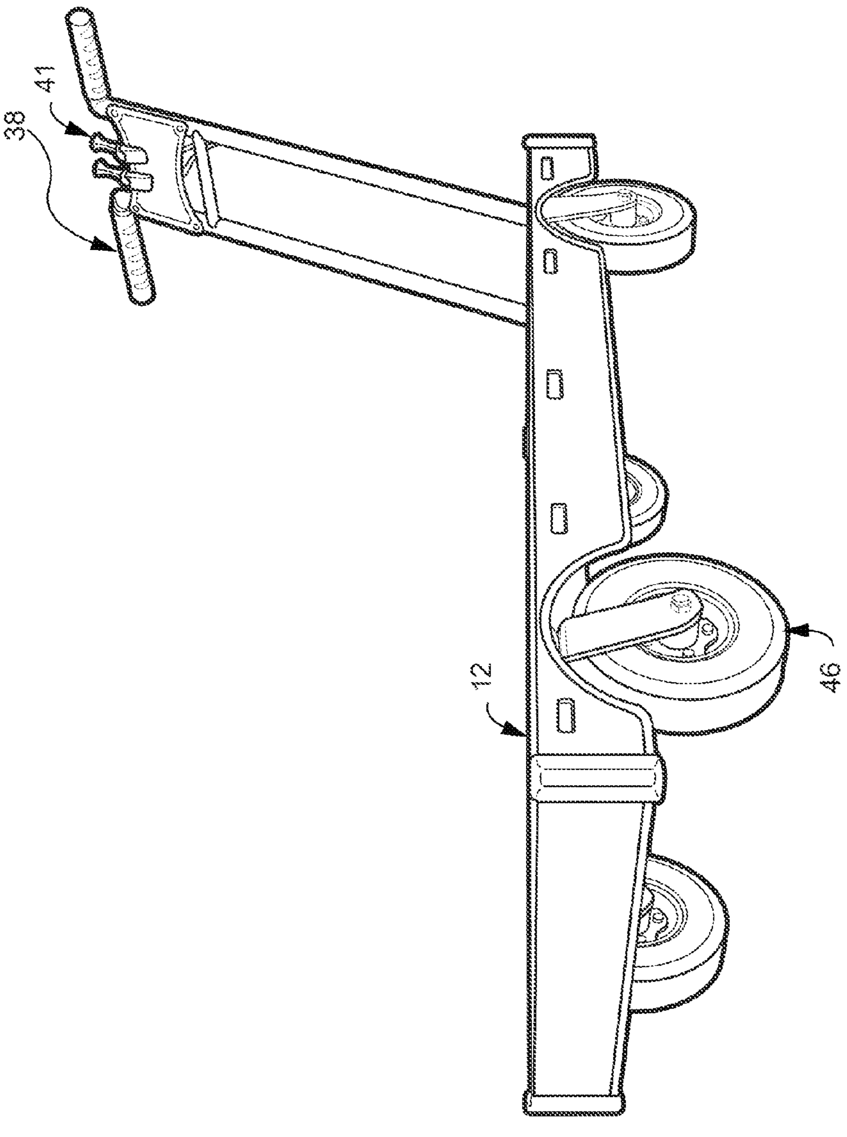
FIG. 4 is a perspective view of the first embodiment in a retracted, moveable position at a second height.
Figures 6, 6A:
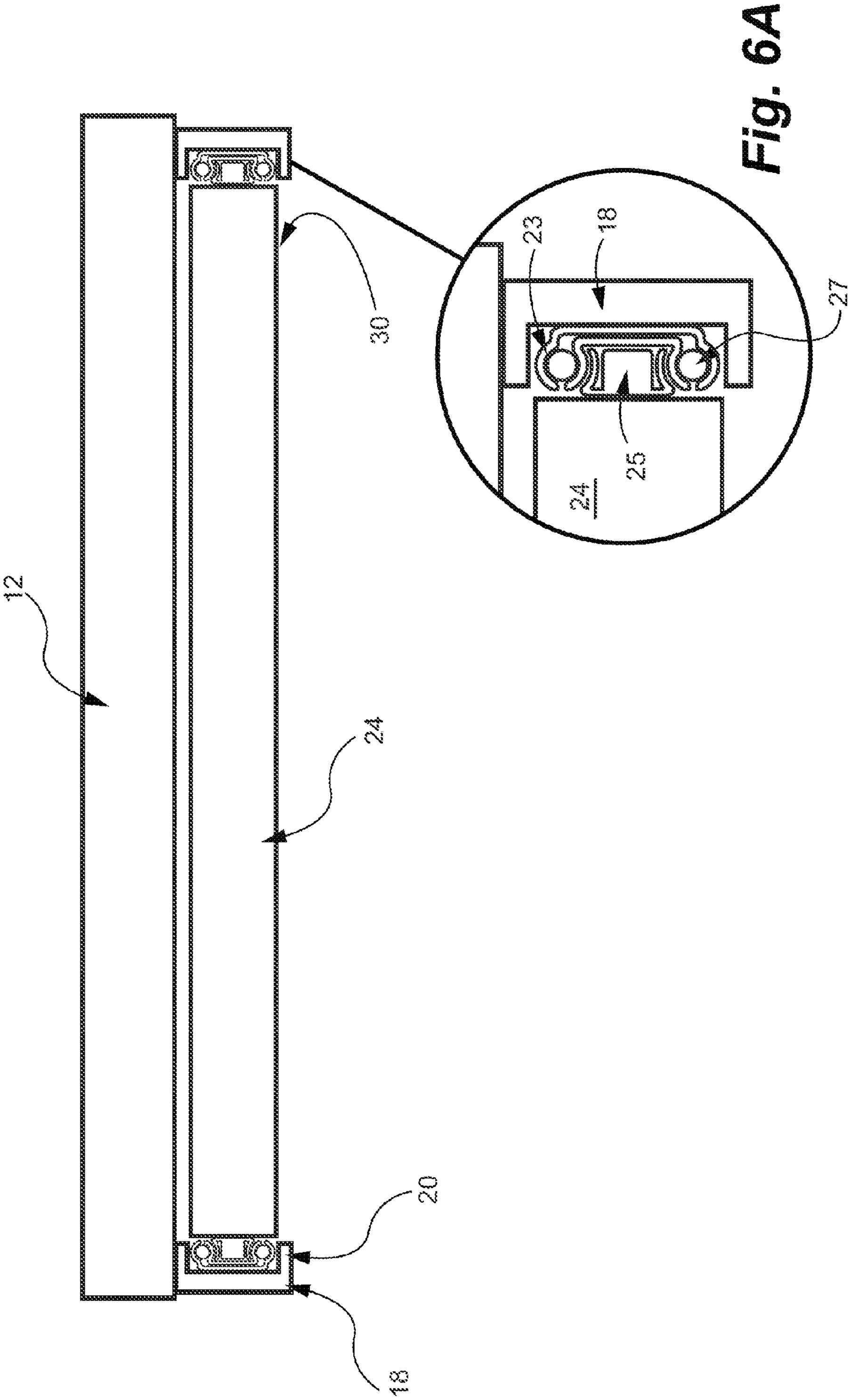
FIG. 6 is a cross-sectional view of the first embodiment of FIG. 3 along lines A-A.
FIG. 6A is an enlargement of the roller assembly of the embodiment of FIG. 6.

Referring now to FIG. 2, the first embodiment 10 is shown in a perspective view. The first embodiment 10 includes a platform 12 having a top surface 14 and a bottom surface 16. The platform 12 also has a forward edge 13 and a back edge 15. The top surface 12 may be textured so as to better grip a load (not shown) placed thereon. The platform 12 further includes a pair of opposed parallel guide rails 18 fixed to the bottom surface 16 along the length of the platform. Each guide rail 18 has an inwardly extending lip 20, as shown in FIG. 6, that holds a roller 22 assembly which will be explained in more detail below. The first embodiment further includes a support member 24. The support member 24 has an upper surface 26 and a lower surface 28 and side edges 30.

Turning now to FIG. 6, the roller assembly includes an outer rail 23 fixed to the guide rail 18 and an inner rail 25 fixed to the side edge 30 of the support member 24. The inner 25 and outer 23 rails slide relative to one another on a series of ball bearings 27 captured therebetween, as shown in FIG. 6A.

As shown in FIG. 2, wheels 36 are mounted to the bottom surface 16 of the platform 12. It is preferred that the wheels 36 be located near the corners of the bottom surface 16 of the platform 12 with two near the forward edge 13 and two near the back edge 15. A pair of handles 38 is pivotably mounted to the platform 12 near the forward edge 13. It should be noted that the handles 38 may be mounted to the support member 24 and may be mounted in any number of ways that enable the first embodiment to function as well as to fold compactly. The first embodiment 10 also includes a lift assembly 40. The lift assembly includes a collapsible frame 42 and a controller assembly 44. The frame 42 includes a pair of collapsible leg assemblies 45 and a stabilizing member 43. Each collapsible leg assembly 45 has a first end 46 and a second end 48. The first end 46 of each leg assembly 45 is pivotably mounted to the lower surface 28 of the support member 24 so as to enable the leg assembly to rotate relative to its mounting location. The stabilizing member 46 is mounted to the second end 48 of each leg assembly 45 in the same manner so as to enable the leg assembly to rotate relative to its mounting location. The stabilizing member 43 has feet 47 mounted thereon for supporting the first embodiment 10 when the platform wheels 36 are not engaged with the ground.

The controller assembly 44 includes a controller 41 and a power unit 49 which powers the controller. The controller 41 controls the height of the lift assembly and will be explained in more detail below. The power unit is preferably a battery sized appropriately for the application. However, it is anticipated that the power unit could be a receptacle that receives AC power. This arrangement requires a local source of AC power and is thus less practical and less convenient.

Figure 7:
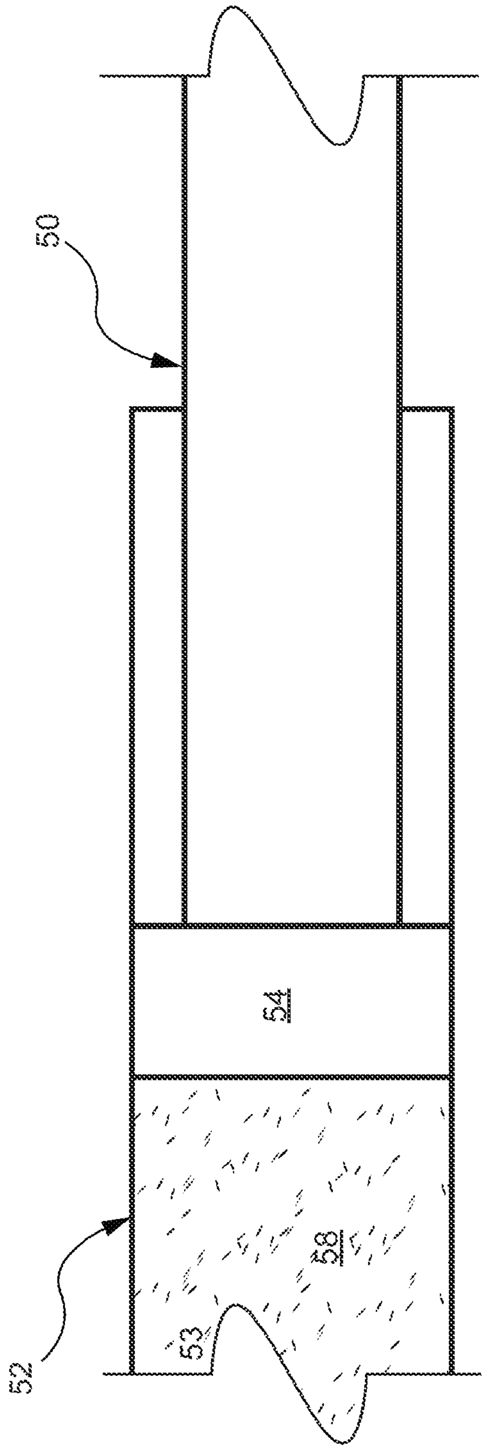
FIG. 7 is a close up cross-sectional view of the leg assembly of the first embodiment along lines B-B of FIG. 3.

Each leg assembly 45 includes an inner leg portion 50 and an outer leg portion 52, shown in detail in FIG. 7. The inner leg portion 50 is located telescopically within at least a portion of the outer leg portion. The outer leg portion 52 has a hollow interior 53 which holds a piston 54. The piston 54 slides axially along the length of the outer leg portion 52 by means of a hydraulic system (not shown). The hydraulic system includes a volume of hydraulic fluid 58, a pump (not shown) and at least one valve (not shown) to control the flow of hydraulic fluid into and out of the hollow interior 53 of the outer leg portion 52. A volume of hydraulic fluid 58 is located within a reservoir (not shown) located proximate to the hollow interior 53 of the outer leg portion 52. The movement of the piston 54 within the hollow interior 53 of the outer leg portion 52 is controlled by increasing or decreasing the volume of hydraulic fluid within the hollow interior 53. This is accomplished by pumping hydraulic fluid 58 into or out of the hollow interior 53. The pump and valve are controlled electrically by the controller assembly 44.

The first embodiment 10 may be used to transfer a load from the cargo bed of a pick-up truck which is at a first location and first height to a second location and second height. To do so, the user firsts grabs the support member 24 and pulls it outwardly away from the truck and away from the platform 12. This movement causes the outer rail 23 to travel with the guide rails 18 and move the support member 24 outwardly from its stored position under the platform 12 to an extended position toward the back of the truck. If the user continues to pull the support member, it will be fully extended and the outer rails 23 will have traveled to the end of the guide rails 18.

At this point the lift assembly 40 is fully cleared from beneath the platform 12. The user then turns on the controller assembly 44. This provides electrical power via the battery 49 to the hydraulic pump and valve. The user then manipulates the controller 41 so as to cause the leg assemblies 45 to move from a fully retracted position to an extended position. This is accomplished by pumping hydraulic fluid 58 from a reservoir into the hollow portion 53 of the outer leg portion 52. The increased volume of hydraulic fluid 58 in the hollow portion 53 causes the piston 54 to press against the inner leg portion 50 which causes the inner leg portion to move in an axial direction outwardly. When the stabilizing member 46 has reached the ground, the user stops the further extension of the leg assemblies 45 by manipulating the controller 43 to stop pumping hydraulic fluid 58 into the hollow portion 53 of the outer leg portion 52. The feet 47 of the stabilizing member 46 engage with the ground.

To complete the transfer of the load from the first height to the second height, the user slides the platform 12 in a direction toward the support member 24 so that the platform is situated above the support member. This results in the inner rails 25 sliding relative to the outer rails 25 over the ball bearings 27 until the inner rails and outer rails are completely retracted and proximate to each other. The user activates the controller 41 to begin retraction of the inner leg portion 50 within the outer leg portion 52. This is accomplished by manipulating the controller 41 to begin evacuation hydraulic fluid 58 from the hollow portion 53 of the outer leg portion 52 and into the reservoir. As a result of the retraction of the inner leg portion 50, the height of the first embodiment 10 is lowered. Once the inner leg portion 50 is fully retracted, the wheels 36 of the platform 12 are in contact with the ground and the feet 47 are retracted beneath the support member 24 located below the platform. The wheels 35 are able to freely rotate and enable to user to move the load and first embodiment 10 to a desired location. The user is also able to power off the controller assembly 44 until the platform height needs to be adjusted.

To move the first embodiment 10 from a second height at a second location, to a first height and first location, the steps are essentially reversed. First the user should move the first embodiment 10 to a location as close to the first location as possible prior to changing the height. Once the first embodiment is moved to the desired location, then the controller assembly 44 is powered up and the controller 41 is manipulated by the user so that the leg assemblies 45 move from a retracted position to an extended position. This is accomplished by pumping hydraulic fluid into the outer leg portion 52 so as to cause the piston 55 to press against the inner leg portion 50 which causes the inner leg portion to extend away from the outer leg portion. Once the platform 12 has reached the desired first height, the user stops power to the controller 41 which in turn stops the movement of the leg assemblies 45. The user then pushes the platform 12 along the forward edge 13 so that the platform slides along the guide rails 18 that ride over the roller assembly 22. This results in the outer rails moving with the platform 12 and relative to the inner rails 25 via the ball bearings 27. When the outer rails 23 move with the platform and the support member 24 stays fixed, the outer rails move via the ball bearings 27 away from the inner rails 25. Once the platform 12 has reached the first location, the user moves the controller 43 so as to cause the leg assemblies 45 to retract. Once the leg assemblies 45 and collapsible frame 42 are fully retracted under the lower surface 28 of the support member 24, the user pushes the support member 24 so that it slides on the roller assembly 22 along the guide rails 18 until it rests beneath the platform 12. This results in the inner rails 25 moving relative to the outer rails 23 via the ball bearings 27 until the inner and outer rails are completely retracted and proximate to each other.

It is important to note that while the description herein has focused on first and second heights and first and second locations, a person of skill in this art would understand that there are infinite combinations and permutations in using this first embodiment. Thus, the first and second references were meant only for describing the function of the first embodiment and are not intended in any way to limit the operation, function or use herein.

Figure 5:
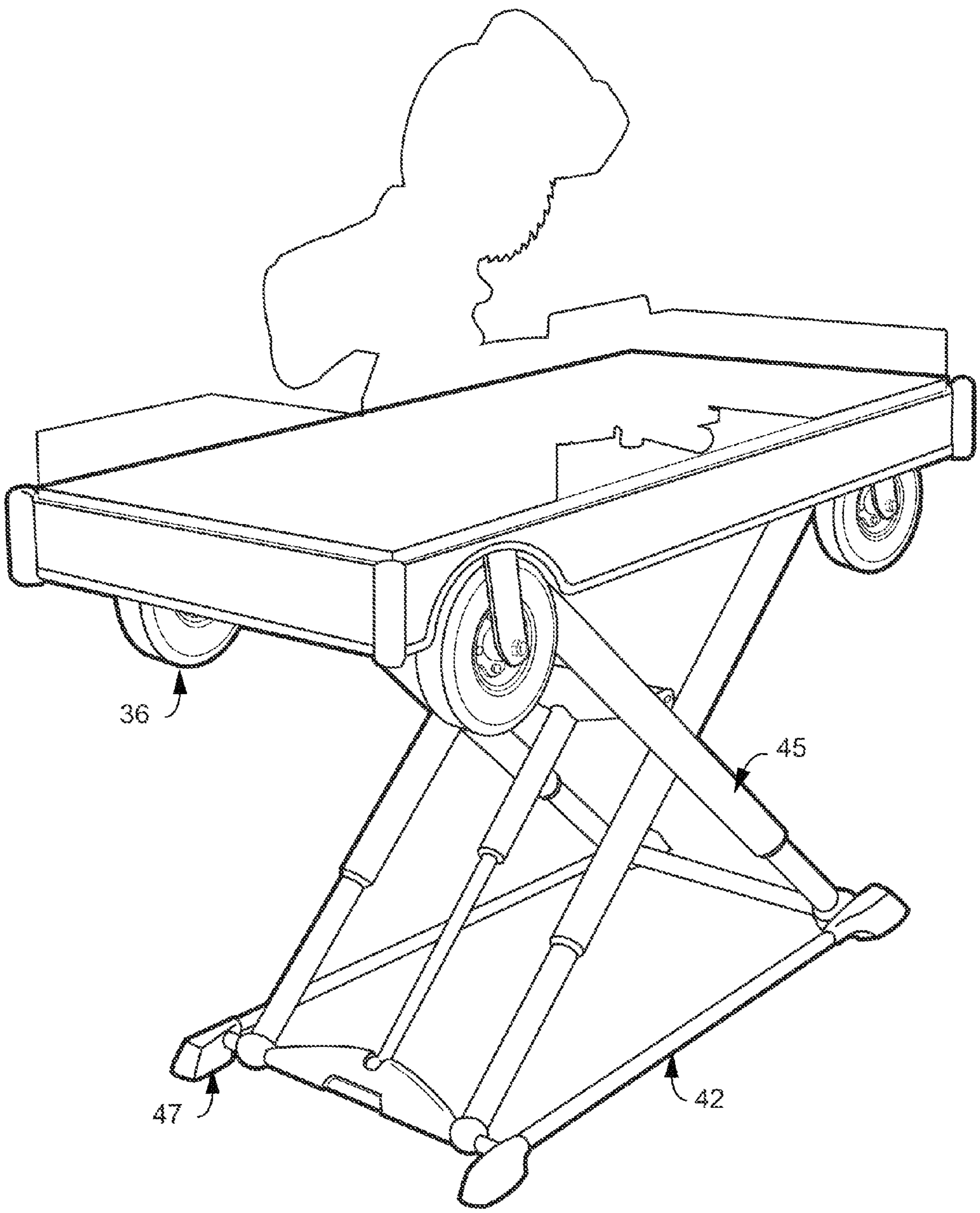
FIG. 5 is a perspective view of the first embodiment in use at a first height.

It is envisioned that the embodiment may include an electrical outlet plug and have an extension cord plugged into it (not shown), so that the platform may be used as a work bench, as shown in FIG. 5. It is further envisioned that the platform may take the form of a picnic table surface for use in picnicking or tailgating and that the height of the platform surface would be adjusted accordingly. It is further envisioned that in lieu of feet at the bottom of the leg assemblies, an alternative embodiment may include lockable casters, wheels or rollers. It should be noted that the ability to lock the casters or rollers would be desirable if the embodiment had any load or weight thereon. If the load was heavy and the casters were not lockable, the user may have difficulty in keeping the embodiment in one place. If the embodiment were to begin rolling or moving, the momentum may be difficult for the user to overcome. This may result in the embodiment overturning and causing damage or injury.

It is also envisioned that the mechanism to adjust the leg assemblies 45 herein described has been a hydraulic system. However, it should be understood by a person of ordinary skill in this art that a number of alternative systems could be employed including but not limited to a mechanical screw whose rotation causes the leg assemblies to increase or decrease in height. Alternatively, a ratcheting system may be used to alter the height of the leg assemblies.

It should be noted that relative terms such as "upper", "lower", "front", "back" and the like are used as a matter of convenience to define a frame of reference and are not intended to limit the orientation in which the embodiments of the invention may be used. It will be appreciated that the embodiments discussed above are preferred embodiments, falling within the scope of the appended claims, and that various alternative embodiments are contemplated.

The invention claimed is:

1. A device for moving a load comprising:

a platform having a top surface and a bottom surface;

two opposing guide members extending from the bottom surface of the platform and oriented along and parallel to the length of the platform;

a support member moveably engaged with each of the two opposing guide members, the support member capable of extending beyond the length of the platform and retracting beneath the platform;

a lift assembly comprising a frame and a controller, the frame pivotably secured at one end to the support member, the frame having a pair of parallel, opposed, leg assemblies where the height of the leg assembly is adjustable from a fully extended position at a first height to a fully retracted position at a second height, and the controller adjusts the height of the leg assemblies; and rotational members rotatably mounted to the platform wherein the rotational members extend below the support member and the lift assembly when the support member and lift assembly are in the fully retracted position beneath the bottom surface of the platform.

2. The device of claim 1 wherein the guide members are fixed to the opposing lengths of the bottom surface of the platform.

3. The device of claim 2 wherein the support member is movably engaged with the guide members by means of a roller assembly mounted to the support member and mounted to the guide member so that the support member and the guide member can slidably move relative to one another.

4. The device of claim 1 wherein the leg assembly height is adjusted by a portion of the leg retracting into or extending from another portion of the leg.

5. The device of claim 1 wherein the controller controls the height of the leg assemblies by means of hydraulics.

6. The device of claim 1 wherein the rotational members are wheels.

7. The device of claim 1 further comprising a handle hingedly mounted to the platform.

8. The device of claim 7 wherein the controller is mounted onto the handle.

9. The device of claim 1 wherein the controller controls the height of the leg assemblies by means of a mechanical screw system where the rotation of the screw causes the leg assemblies to increase or decrease in height.

10. A method for moving a load from a first height to a second height comprising the steps of:

providing the device of claim 1 placing a load on the upper surface of the platform, the upper surface of the platform being at a first height;

causing the support member to move from a first retracted position where the support member was located beneath the bottom surface of the platform to a second position where the guide members enable the support member to move lengthwise extending beyond at least a portion of the length of the platform;

moving the lift assembly from a first retracted position beneath the support member to a second extended position where the leg assemblies height increases so that the support member is now supported by the lift assembly at the first height;

moving the platform along the guide members from an extended position beyond the support member to a retracted position where the bottom surface of the platform is above the support member;

causing the leg assemblies height to decrease to a second height.

11. The method of claim 10 wherein the height of the leg assemblies is controlled by means of hydraulics.

12. The method of claim 10 wherein the height of the leg assemblies is controlled by means of a mechanical screw system where the rotation of the screw causes the leg assemblies to increase or decrease in height.

* * * * *